G. L. SCHOFIELD.
WHEEL AXLE FOR MOTOR VEHICLES.
APPLICATION FILED MAY 17, 1920.
1,367,894.
Patented Feb. 8, 1921.
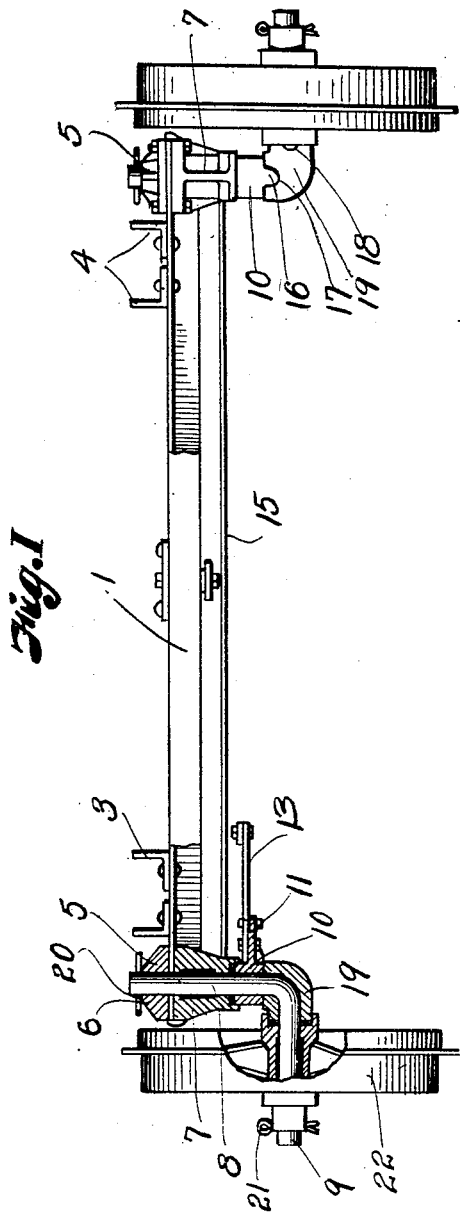
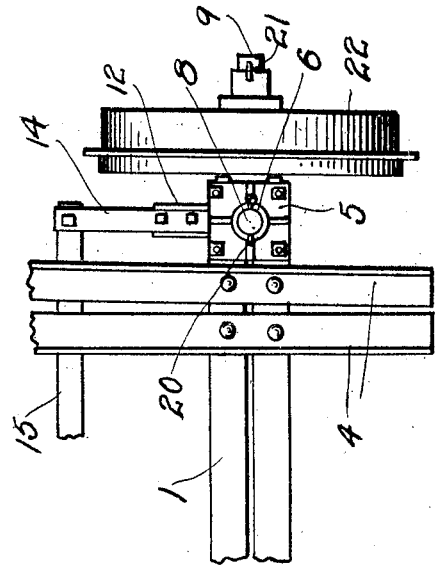
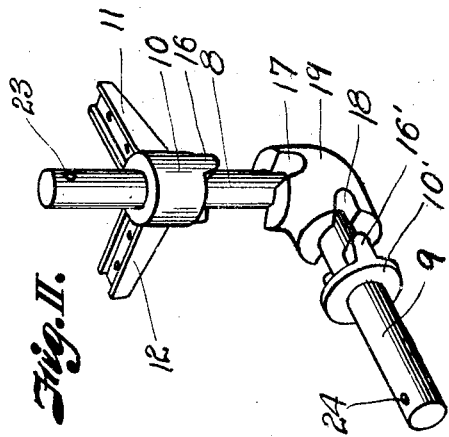
Inventor
George L. Schofield.
Arthur C. Brown
By
Attorney

UNITED STATES PATENT OFFICE.

GEORGE L. SCHOFIELD, OF KANSAS CITY, MISSOURI.

WHEEL-AXLE FOR MOTOR-VEHICLES.

1,367,894. Specification of Letters Patent. Patented Feb. 8, 1921.

Application filed May 17, 1920. Serial No. 382,126.

*To all whom it may concern:*

Be it known that I, GEORGE L. SCHOFIELD, a citizen of the United States, residing at Kansas City, in the county of Jackson and State of Missouri, have invented certain new and useful Improvements in Wheel-Axles for Motor-Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a wheel axle for motor vehicles and particularly to a steering wheel axle, and one of the objects thereof is to provide means whereby when the wheel bearing portion of the axle becomes worn, the axle may be inverted and a new spindle or wheel bearing portion may be presented to the wheel.

It is also an object of the invention to provide an axle which may be readily attached to and detached from the bearings in the vehicle frame without the necessity of employing special tools.

The invention is shown as being associated with the steering wheels of a tractor frame but it is applicable for use in other relations if desired.

Figure I is an end view of a vehicle to which my invention is applied, the bearings for the reversible axle being shown in section.

Fig. II is a perspective view of the reversible axle and the steering knuckle therefor, and Fig. III is a plan view of part of the vehicle frame.

The vehicle frame is shown as consisting of the cross beams or bolsters 1, which connect the longitudinal channel or side members 3 and 4 whereby a substantially rectangular frame is provided. The bolsters 1 support bearing blocks 5, which may be suitably bolted thereto and which are provided with central spindle-receiving openings 6 and beneath the bolsters are guide blocks 7, through which the spindles of the axle members pass.

The axle members are shown as consisting of right angularly disposed portions 8 and 9, the portions 9 carrying knuckles consisting of collars 10. One of the collars is provided with right angularly disposed brackets 11 and 12, the bracket 11 constituting a connection for the steering arm 13, which may be conveniently attached to the steering mechanism of the motor vehicle. The arms 12 are connected to lever arms 14, to which the ends of the connecting or steering link 15 is pivoted so that when the arm 13 on the steering connection 11 is operated to cause the spindle 8 to rotate, similar motion will be imparted to the collar 10 on the opposite side of the frame, through the medium of the arms 12 and the connecting link 15. The collars 10 are provided with lugs or projections 16, adapted to engage recesses 17 or 18, as the case may be, in the elbow collar or block 19 at the angle of intersection of the members 8 and 9, and when the spindle, either 8 or 9, engages the block 7 and the bearing 5, the collar 10 will be fast thereon through the medium of the lugs or projections 16, which engage the recesses 17 or 18 and, therefore, when the collar is turned, the spindle, either 8 or 9, will be rotated in its bearing 5 and block 7. The spindle 8 is shown in Fig. I as secured in place by means of a cotter pin 20 and this cotter pin may be readily removed, as may also the cotter pin 21 at the outer end of the portion 9, so that the wheel 22 may be taken off and the axle member reversed.

It is understood that the members 8 and 9, connected to the elbow portion 19, are practically duplicates of one another as they are of the same diameter and length. Therefore, if the member 8 is in the position shown in Fig. I, with the wheel on the portion 9, the portion 9 will serve as the axle for the wheels 22. If the axle 9 becomes worn, the cotter pins 20 and 21 will be removed and the member 9 will be inserted through the collar 10, through the block 6 and through the bearing 5. The cotter pin 21 will then be placed in its opening but will occupy a position similar to that occupied by the cotter pin 20 in Fig. II. The spindle 8, which previously was the vertical portion of the axle member, will now assume a horizontal position to receive the wheel 22, whereupon the cotter pin 21 will be placed in the opening in the end of the member 8 and assume the position formerly assumed by the cotter pin 20.

The cotter pin opening for the member 8 is designated 23 and the cotter pin opening for the member 9 is designated 24.

It will be apparent from the foregoing that a single set of axle members for the steering wheels will serve the purpose of steering members as well as axle members and that when the axle members become worn, they can be reversed to serve as the steering spindles and relatively new axle portions may be presented upon reversal of the parts so that the repairs for the axles and wheels may be quickly and conveniently made without the necessity of employing special tools or deranging the construction of the tractor frame.

What I claim and desire to secure by Letters-Patent is:

1. A wheel axle comprising a shaft having two connected right angular members, one of which is a duplicate of the other, a collar rigidly connected thereto, one right angular projection being a wheel supporting means and the other member being a frame engaging means, the collar rigidly connected at the elbow constituting the meeting ends of the members, a steering collar loose on one of the members, and means on the steering collar for engaging the rigid collar.

2. A wheel axle comprising an L-shaped member having a collar rigidly connected thereto at the elbow, a steering collar sleeved on one of the arms of said member, and means for effecting engagement between the steering collar and the rigid collar.

3. A wheel axle comprising an elbow member having a collar rigidly secured thereto and provided at its respective ends with transverse through openings, the arms of the elbow member being duplicates one of the other, and a steering collar interchangeably engageable with either of said arms and having means for engagement with the rigid collar.

4. A wheel axle comprising an L-shaped member having a collar rigidly connected thereto at the elbow, means for supporting the wheel on one arm of the member, means for securing the other arm of the member to the frame, and a steering collar, loose on one of the members and engaging the collar.

5. The combination with a frame, of a wheel axle carried by said frame and consisting of an elbow member having a collar rigidly secured thereto, said collar having recesses in its edges, a steering collar sleeved on said member, and a projection on the steering collar for engagement with the recess on the first-named collar.

6. A wheel axle comprising an L-shaped member having a collar rigidly connected thereto at the elbow, means for supporting the wheel on one arm of the member, means for securing the other arm of the member to the frame, and a steering collar, loose on one of the members and engaging the collar.

7. The combination with a frame, of a wheel axle carried by said frame and consisting of an elbow member having a collar rigidly secured thereto, said collar having recesses in its edges, a steering collar sleeved on said member, and a projection on the steering collar for engagement with the recess on the first-named collar.

In testimony whereof I affix my signature.

GEORGE L. SCHOFIELD.